(12) United States Patent
Yanase

(10) Patent No.: US 9,476,493 B2
(45) Date of Patent: Oct. 25, 2016

(54) DIFFERENTIAL DEVICE AND METHOD OF MANUFACTURING THE SAME

(71) Applicant: MUSASHI SEIMITSU INDUSTRY CO., LTD., Toyohashi-Shi, Aichi (JP)

(72) Inventor: Yoichi Yanase, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 59 days.

(21) Appl. No.: 14/578,797

(22) Filed: Dec. 22, 2014

(65) Prior Publication Data
US 2015/0184735 A1 Jul. 2, 2015

(30) Foreign Application Priority Data
Dec. 27, 2013 (JP) ................................. 2013-271808

(51) Int. Cl.
*F16H 48/40* (2012.01)
*B23K 31/02* (2006.01)
*F16H 48/08* (2006.01)
*F16H 48/38* (2012.01)

(52) U.S. Cl.
CPC .............. *F16H 48/40* (2013.01); *B23K 31/02* (2013.01); *B23K 2201/008* (2013.01); *F16H 48/08* (2013.01); *F16H 2048/382* (2013.01); *F16H 2048/385* (2013.01)

(58) Field of Classification Search
CPC .. F16H 48/08; F16H 48/40; F16H 2048/382; F16H 2048/385
See application file for complete search history.

(56) References Cited

U.S. PATENT DOCUMENTS

| 2,529,392 | A | * | 11/1950 | Herreshoff | B60K 17/16 475/230 |
| 8,876,649 | B2 | | 11/2014 | Uchida et al. | |
| 2001/0039228 | A1 | * | 11/2001 | Eulenstein | F16H 48/08 475/230 |
| 2008/0229878 | A1 | * | 9/2008 | Kohno | F16H 48/08 74/606 R |
| 2012/0295751 | A1 | * | 11/2012 | Okada | F16H 57/0483 475/160 |

FOREIGN PATENT DOCUMENTS

| JP | 2003-001490 A | 1/2003 |
| JP | 2007-010040 A | 1/2007 |
| JP | 2011-000624 A | 1/2011 |
| JP | 2011-167746 A | 9/2011 |
| JP | 5327130 B2 | 10/2013 |
| JP | 5332937 B2 | 11/2013 |
| JP | 5359813 B2 | 12/2013 |
| WO | 2013/018223 A1 | 2/2013 |

* cited by examiner

Primary Examiner — Huan Le
(74) Attorney, Agent, or Firm — Carrier Blackman & Associates, P.C.; Joseph P. Carrier; William D. Blackman

(57) ABSTRACT

In a differential device and a method of manufacturing it, a press-fit regulation device regulating a press fit depth of the flange and the ring gear is provided in a press-fit portion between the flange and the ring gear, the flange includes thin-walled portions with recessed portions and thick-walled portions without the recessed portions, the thick-walled portions and the ring gear are welded from a second bearing boss side to a predetermined weld depth, and the thin-walled portions and the ring gear are welded from the second bearing boss side to a weld depth shallower than the predetermined weld depth or not welded. Accordingly, the press-fit portion between the flange and the ring gear can be efficiently welded even in a case where work windows of a differential case cut into a side surface of the flange on a first bearing boss side to form the recessed portions.

7 Claims, 4 Drawing Sheets

DIFFERENTIAL DEVICE AND METHOD OF MANUFACTURING THE SAME

BACKGROUND OF THE INVENTION

1. Field of the Invention

The present invention relates to a differential device and a method of manufacturing the same, the differential device comprising: a differential mechanism; and a differential case housing the differential mechanism, the differential case including: first and second bearing bosses formed integrally therewith on one side portion and another side portion of the differential case and aligned on a same axis to be supported by a transmission case via bearings; an annular flange formed integrally with the differential case on an intermediate portion which is offset from a center of the differential case toward the second bearing boss side; work windows for inserting the differential mechanism, the work windows being provided in portions of a peripheral wall of the differential case which face each other on a diametral line orthogonal to the axis, the flange having a ring gear press-fitted to an outer peripheral surface thereof; and a press-fit portion between the flange and the ring gear being welded on the second bearing boss side.

2. Description of the Related Art

Such a differential device is known as disclosed in International Publication No. WO2013-18223.

In the differential device disclosed in International Publication No. WO2013-18223, wall thickness of a flange of a differential case is uniform over an entire periphery, and welding of a press-fit portion between the flange and a ring gear is performed on right and left opposite side portions. In a case where work windows are formed to be large in order to facilitate inner surface machining of the differential case and insertion of a differential mechanism into the differential case, the work windows may cut into a side surface of the flange on a first bearing boss side to form recessed portions. In a case of a differential case having such recessed portions, all-around welding of the flange with the ring gear on the opposite side portions causes various problems. For example, in a case where the side surface of the flange on the first bearing boss side is welded, a position of a welding torch needs to be changed in accordance with shapes of the recessed portions, and operation efficiency is decreased. Moreover, even if the work windows are covered with jigs to prevent spatters produced during the welding from entering the differential case, the spatters are prone to enter the differential case due to the existence of the recessed portions. Further, when a side surface of the flange on a second bearing boss side is welded as well, piercing welding is prone to occur in the recessed portions because the wall thickness of the flange is small in portions corresponding to the recessed portions. As a result, the spatters scatter toward the first bearing boss side, and may adhere to an inner surface of the differential case.

SUMMARY OF THE INVENTION

The present invention has been made in view of the above-described circumstances, and an object of the present invention is to provide a differential device in which a press-fit portion between a flange and a ring gear can be favorably welded even in the case where work windows cut into a side surface of the flange on a first bearing boss side to form recessed portions, and a method of manufacturing the same.

In order to achieve the object, according to a first aspect of the present invention, there is provided a differential device comprising: a differential mechanism; and a differential case housing the differential mechanism, the differential case including: first and second bearing bosses formed integrally therewith on one side portion and another side portion of the differential case and aligned on a same axis to be supported by a transmission case via bearings; an annular flange formed integrally with the differential case on an intermediate portion which is offset from a center of the differential case toward the second bearing boss side; work windows for inserting the differential mechanism, the work windows being provided in portions of a peripheral wall of the differential case which face each other on a diametral line orthogonal to the axis, the work windows cutting into the flange to form recessed portions in a side surface of the flange on the first bearing boss side, the flange having a ring gear press-fitted to an outer peripheral surface thereof; and a press-fit portion between the flange and the ring gear being welded, wherein press-fit regulation means for regulating a press fit depth of the flange and the ring gear is provided in the press-fit portion between the flange and the ring gear, the flange includes thin-walled portions in which the recessed portions exist and thick-walled portions which are free of the recessed portions, the thick-walled portions and the ring gear are subjected to welding from the second bearing boss side to a predetermined weld depth, and the thin-walled portions and the ring gear are subjected to the welding from the second bearing boss side to a weld depth shallower than the predetermined weld depth or not welded.

According to the first aspect of the present invention, press-fit regulation means for regulating the press fit depth of the flange and the ring gear is provided in the press-fit portion between the flange and the ring gear, and the thick-walled portions of the flange and the ring gear are welded from the second bearing boss side to the predetermined weld depth. Accordingly, in spite of the fact that the welding of the press-fit portion between the flange and the ring gear is performed only on one side-surface side of the flange and the ring gear, bond strength of the press-fit portion between the flange and the ring gear can be improved, and manufacturing cost can be reduced by improving efficiency of welding operation. Further, since the one side-surface side of the flange and the ring gear to be welded is opposite to the work windows, there is no concern that spatters produced during the welding enter the differential case through the work windows. Moreover, since the thin-walled portions of the flange and the ring gear are welded from the second bearing boss side to the weld depth shallower than the predetermined weld depth or not welded, piercing welding in the thin-walled portions can be avoided, and the spatters can be prevented from entering the differential case. Note that the press-fit regulation means corresponds to a stopper wall 22 of an embodiment of the present invention described later.

According to a second aspect of the present invention, in addition to the first aspect, a welding start point and a welding end point of the press-fit portion between the flange and the ring gear are matched in each of the thick-walled portions.

According to the second aspect of the present invention, the welding start point and the welding end point of the press-fit portion between the flange and the ring gear are matched in each of the thick-walled portions. Accordingly, portions of the flange and the ring gear which have possibility of strength reduction can be provided in the thick-walled portions. Specifically, an entire periphery can be welded without gaps by matching the welding start point and the welding end point (so-called welding twice), but strength reduction in the flange and the ring gear is caused by welding the same position twice. For this reason, the matched point is provided in the thick-walled portion. Thus, influence of strength reduction in the flange and the ring gear can be minimized. Moreover, even if a weld depth becomes deep at the matched point, piercing welding can be avoided.

According to a third aspect of the present invention, in addition to the second aspect, the press-fit portion between the flange and the ring gear is equally divided into a plurality of divided regions arranged along a peripheral direction, and the welding start point and the welding end point adjacent thereto, of each of the divided regions are matched in each of the thick-walled portions.

According to the third aspect of the present invention, the press-fit portion between the flange and the ring gear is equally divided into the plurality of divided regions arranged along the peripheral direction, and the welding start point and the welding end point adjacent thereto, of each of the divided regions are matched in each of the thick-walled portions. Accordingly, the thermal strain of the flange and the ring gear caused by welding can be eliminated or significantly reduced.

According to a fourth aspect of the present invention, in addition to the second aspect, intervals from the welding start point and the welding end point matched with each other to the thin-walled portions are set to 45° or more about a central axis of the flange.

According to the fourth aspect of the present invention, the intervals from the welding start point and the welding end point matched with each other to the thin-walled portions of the flange are set to 45° or more about the central axis of the flange. Accordingly, the thermal strain of the thin-walled portions occurring due to an increase in welding heat input caused by the matching of the welding start point and the welding end point can be suppressed. Moreover, by setting the matched point of the welding start point and the welding end point at a position located away from the thin-walled portions in the peripheral direction, strength reduction in the flange and the ring gear can be reduced.

According to a fifth aspect of the present invention, in addition to the first aspect, a pin hole into which a falling-off prevention pin for a pinion shaft of the differential mechanism is fitted is provided to pass through an outer peripheral portion of the differential case, and the welding start point is set with reference to the pin hole.

According to the fifth aspect of the present invention, the pin hole into which the falling-off prevention pin for the pinion shaft of the differential mechanism is fitted is provided to pass through the outer peripheral portion of the differential case, and the welding start point is set with reference to the pin hole. Accordingly, welding can be properly performed without providing a special mark for setting the welding start point.

According to a sixth aspect of the present invention, in addition to the first aspect, the ring gear comprises a rim having a tooth portion on an outer periphery thereof, a hub surrounded by the rim and press-fitted to the flange, and a spoke integrally connecting the rim and the hub; and a rotational center plane of the spoke is disposed closer to the first bearing boss than a rotational center plane of the flange.

According to the sixth aspect of the present invention, since the rotational center plane of the spoke of the ring gear is disposed closer to the first bearing boss than the rotational center plane of the flange, the ring gear is placed as close as possible to the center of the differential case. Accordingly, torque transmission from the ring gear to the differential case can be made favorable. Moreover, thrust loads and a radial load acting on the ring gear can be shared in good balance by the bearing which allows the first bearing boss to be supported by the transmission case and the bearing which allows the second bearing boss to be supported by the transmission case.

According to a seventh aspect of the present invention, there is provided a method of manufacturing the differential device according to the first aspect, wherein when the welding is performed on the thin-walled portions and the ring gear, welding output is reduced lower than that in the welding of the thick-walled portions, or welding speed is increased higher than that in the welding of the thick-walled portions.

According to the seventh aspect of the present invention, when the thin-walled portions and the ring gear are welded, the weld depths between the thin-walled portions and the ring gear can be made shallower than the weld depths between the press-fit portion and the ring gear, as desired, by reducing the welding output lower than that in the welding of the thick-walled portions or increasing the welding speed higher than that in the welding of the thick-walled portions.

The above and other objects, characteristics and advantages of the present invention will be clear from detailed descriptions of the preferred embodiment which will be provided below while referring to the attached drawings.

DESCRIPTION OF THE PREFERRED EMBODIMENT

Hereinafter, an embodiment of the present invention will be described based on the accompanying drawings.

Figure 1:
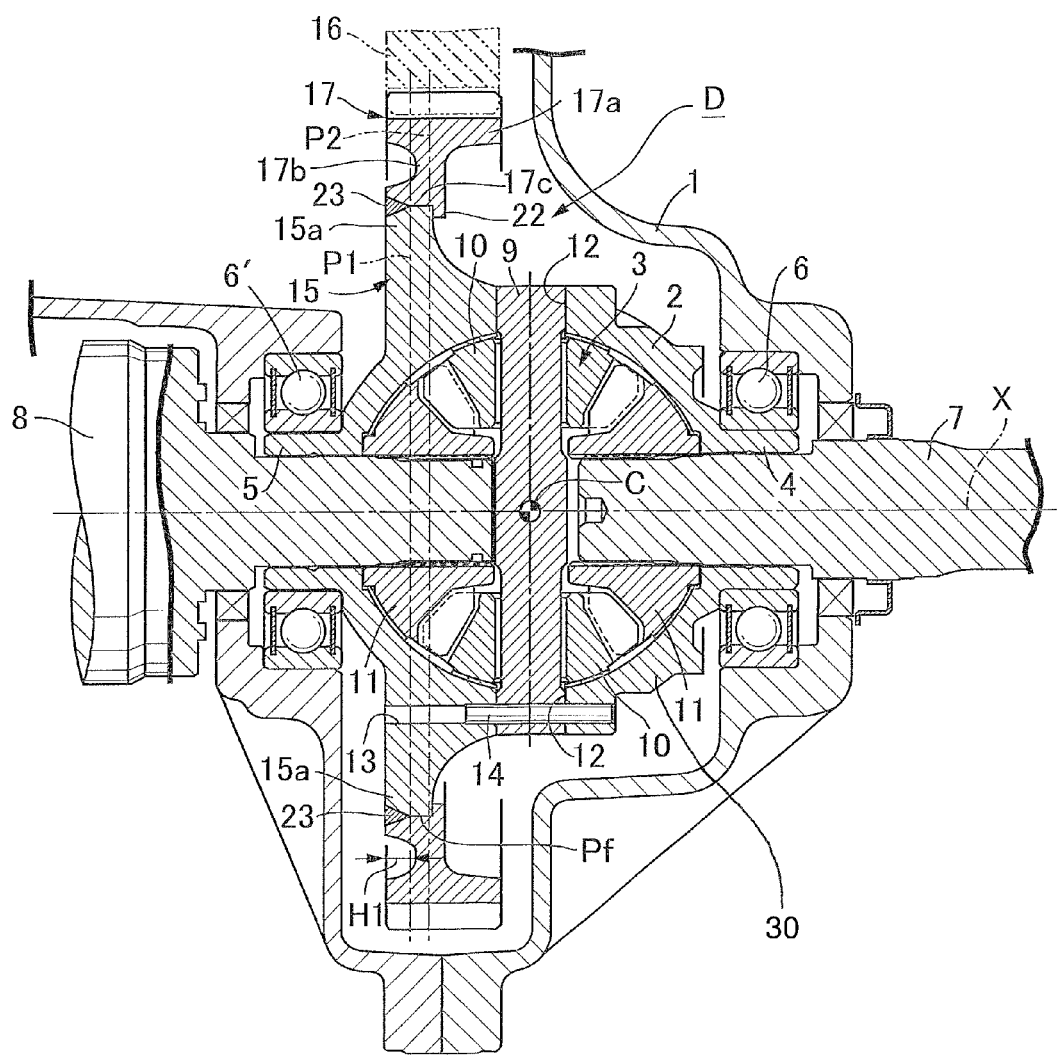
FIG. 1 is a longitudinal sectional plan view partially showing a differential device of the present invention and a transmission case for housing the same.

In FIG. 1, a differential device D is housed in a transmission case 1 of a vehicle. This differential device D includes a differential case 2 and a differential mechanism 3 housed in this differential case 2. The differential case 2 includes a differential case body 30, which may also be referred to as a case body 30 herein. On a right side portion and a left side portion case body 30 of the differential case 2, a first bearing boss 4 and a second bearing boss 5 aligned on the same axis X are formed integrally therewith. These first and second bearing bosses 4, 5 are configured to be supported by the transmission case 1 via bearings 6 and 6', and support right and left axles 7, 8.

The differential mechanism 3 includes a pinion shaft 9 held by the differential case 2 to be orthogonal to the axis X, a pair of pinion gears 10 supported by the pinion shaft 9, and a pair of side gears 11 spline-connected to inner ends of the axles 7, 8 to mesh with the pinion gears 10. A back face of each gear is rotatably supported by a spherical inner surface of the differential case 2.

The pinion shaft 9 is held by a pair of supporting holes 12 in an outer peripheral portion of the differential case 2. The outer peripheral portion of the differential case 2 is provided with a pin hole 13 laterally passing through the outer peripheral portion to be orthogonal to one of the supporting holes 12. A falling-off prevention pin 14 press-fitted into the pin hole 13 passes through the pinion shaft 9. This achieves the prevention of the falling off of the pinion shaft 9 from the supporting hole 12.

Moreover, the case body 30 of the differential case 2 has an annular flange 15 formed integrally therewith on an intermediate portion which is offset from a center C of the differential case 2 toward the second bearing boss 5 side. A ring gear 17 to mesh with an output gear 16 of a transmission is attached to the flange 15.

Figure 2:
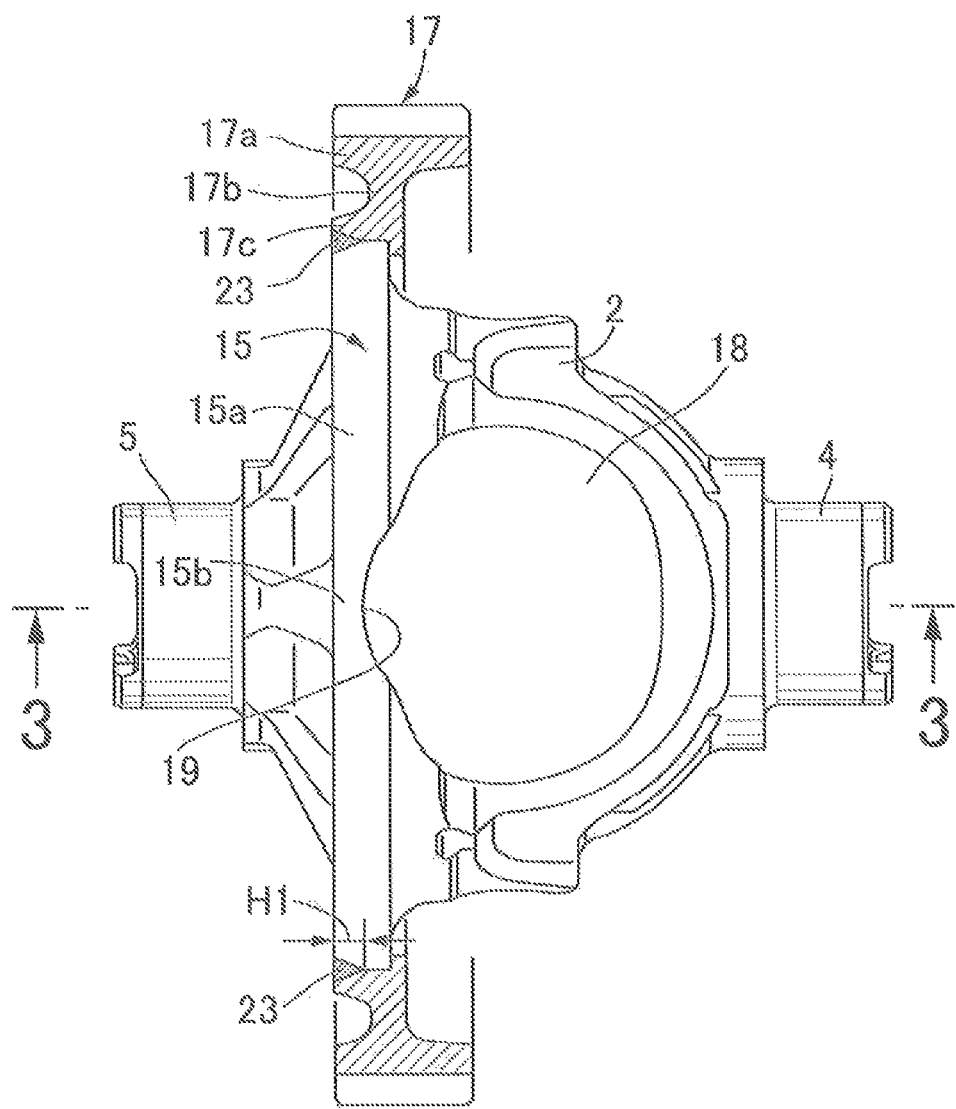
FIG. 2 is a plan view of a differential case of the above-described differential device.
Figure 3:
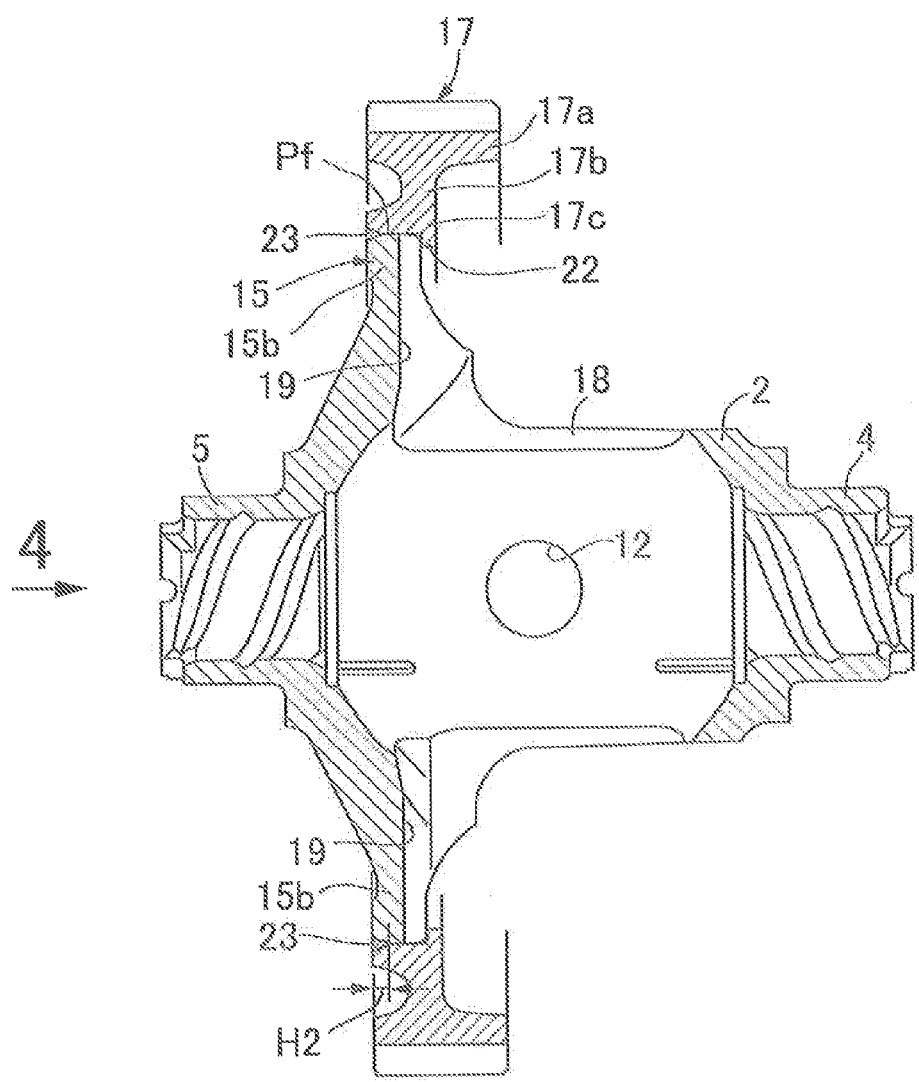
FIG. 3 is a sectional view taken along line 3-3 in FIG. 2.
Figure 4:
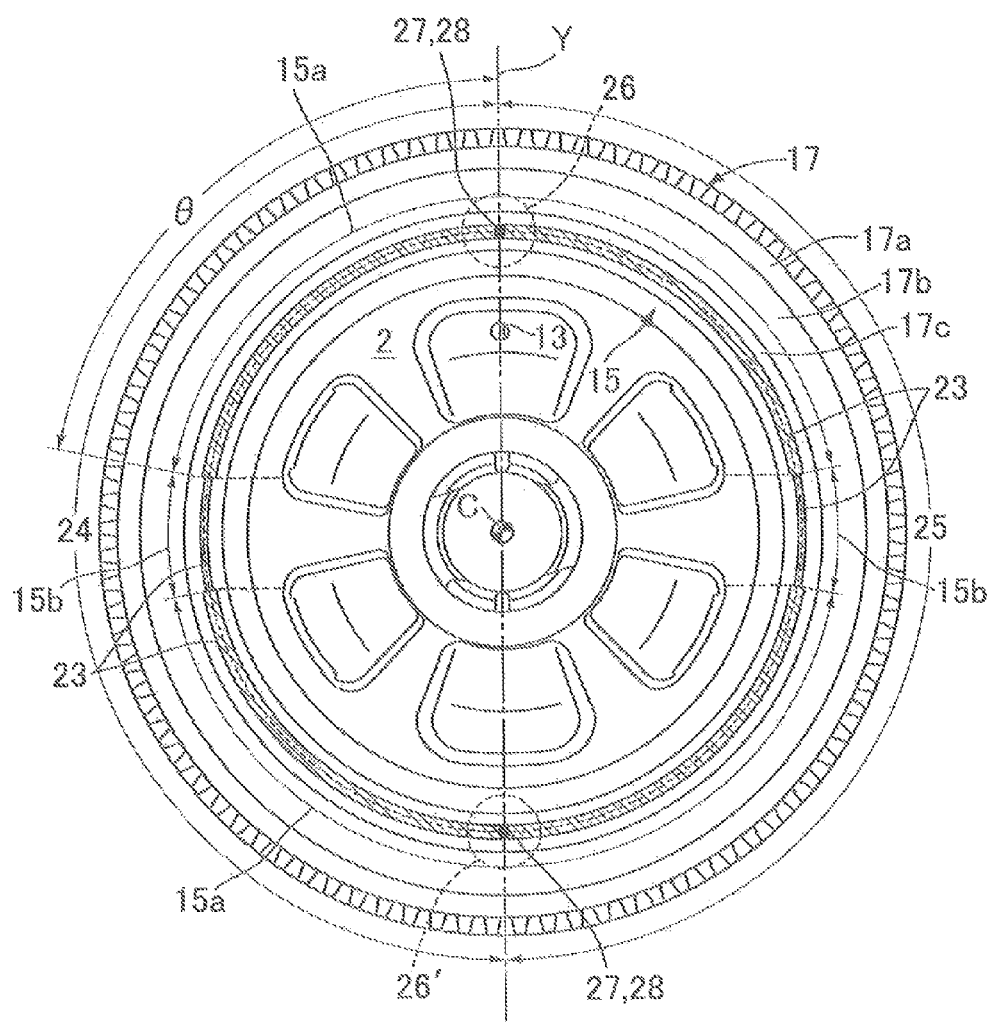
FIG. 4 is a view from arrow 4 in FIG. 3 and shows how to weld a flange and a ring gear.

As shown in FIGS. 2 to 4, further, in portions of a peripheral wall of the differential case 2 which face each other on a diametral line orthogonal to the axis X, a pair of work windows 18 for machining the spherical inner surface of the differential case 2 and for facilitating insertion of the differential mechanism 3 into the differential case 2 are provided. These work windows 18 are formed to be large so as to cut into the flange 15. Thus, recessed portions 19 are formed in a side surface of the flange 15 on the first bearing boss 4 side. Accordingly, the flange 15 has a pair of thin-walled portions 15b in which the recessed portions 19 exist and a pair of thick-walled portions 15a in which the recessed portions 19 do not exist.

As shown in FIGS. 1 and 3, the ring gear 17 includes a rim 17a having a helical tooth group on an outer periphery thereof, a plate-shaped spoke 17b protruding from an inner peripheral surface of the rim 17a, and an annular hub 17c protruding from a side surface of an end portion of an inner periphery of the spoke 17b on the second bearing boss 5 side. An annular stopper wall 22 protruding on an inner peripheral surface side of the hub 17c is formed integrally with the spoke 17b. The hub 17c is press-fitted to the flange 15 from the first bearing boss 4 side. At this time, the stopper wall 22 comes into contact with a side surface of the flange 15 to regulate a press fit depth thereof.

In the above-described ring gear 17, a rotational center plane P2 of the spoke 17b is disposed closer to the first bearing boss 4 than a rotational center plane P1 of the flange 15. Thus, the ring gear 17 is placed as close as possible to the center C of the differential case 2, and torque transmission from the ring gear 17 to the differential case 2 can be made favorable. Moreover, thrust loads and a radial load acting on the ring gear 17 can be shared in good balance by a bearing 6 which allows the first bearing boss 4 to be supported by the transmission case 1 and a bearing 6' which allows the second bearing boss 5 to be supported by the transmission case 1.

Moreover, in the transmission case 1, there are cases where a position in a right-left direction of the output gear 16 which is to mesh with the ring gear 17 is changed in accordance with the specification of the transmission. According to the present embodiment, since the rotational center plane P2 of the spoke 17b is disposed as close as possible to the center C of the differential case 2, a change in the position of the output gear 16 to the left or right direction can be handled by elongating only the rim 17a to the left or right direction in accordance with the output gear 16 without changing a position of the spoke 17b. Thus, a flexible response can be made to a change in the specification of the output gear 16.

In FIG. 4, a press-fit portion Pf between the flange 15 and the hub 17c are subjected to laser welding 23 from the second bearing boss 5 side, over an entire periphery of the press-fit portion Pf.

In the welding, the pin hole 13 is provided in a central portion of the thick-walled portion 15a in advance, and the press-fit portion Pf between the flange 15 and the hub 17c is equally divided into first and second divided regions 24, 25 by a diametral line Y of the flange 15 which passes through a center of the pin hole 13. Then, a pair of laser torches 26, 26' are set to be pointed at two dividing points between the first and second divided regions 24, 25, respectively. While the laser torches 26, 26' or the differential case 2 is rotated in a fixed direction about a central axis of the flange 15, the welding 23 is performed by irradiating the first and second divided regions 24, 25 with laser beam. In this way, welding start points 27 and welding end points 28 of the first and second divided regions 24, 25 adjacent to each other are respectively matched in the central portions of the respective thick-walled portions 15a.

Moreover, at this time, when the welding 23 is performed on the thin-walled portions 15b, weld depths H2 (see FIG. 3) of the thin-walled portions 15b are made shallower than weld depths H1 (see FIG. 1) of the thick-walled portions 15a by reducing laser output lower than that in the welding of the thick-walled portions 15a or increasing welding speed higher than that in the welding of the thick-walled portions 15a. Alternatively, the thin-walled portions 15b are not welded.

Next, the operation of this embodiment will be described. In the ring gear 17, the annular stopper wall 22 protruding on the inner peripheral surface side of the hub 17c is formed integrally with the rim 17a. When the hub 17c is press-fitted to the flange 15 of the differential case 2 from the first bearing boss 4 side, the stopper wall 22 comes into contact with the side surface of the flange 15 to regulate the press fit depth. The press-fit portion Pf between the flange 15 and the hub 17c of the ring gear 17 is subjected to the laser welding 23 from the second bearing boss 5 side. Accordingly, in spite of the fact that the welding of the press-fit portion Pf between the flange 15 and the hub 17c is performed only on one side-surface side of the flange 15 and the hub 17c, bond strength between the flange 15 and the hub 17c can be improved, and manufacturing cost can be reduced by improving efficiency of welding operation. Further, since the one side-surface side of the flange 15 and the hub 17c to be welded is opposite to the work windows 18, there is no concern that spatters produced during the welding enter the differential case 2 through the work windows 18.

Moreover, when the welding 23 is performed on the above-described press-fit portion Pf, the thick-walled portions 15a of the flange 15 and the ring gear 17 are welded to the predetermined weld depth H1, and the thin-walled portions 15b of the flange 15 and the ring gear 17 are welded to the weld depth H2 shallower than the predetermined weld depth H1 or not welded at all. Accordingly, piercing welding in the thin-walled portions 15b can be avoided, and spatters can be prevented from entering the differential case 2.

Moreover, the welding start points 27 and the welding end points 28 of the press-fit portion Pf between the flange 15 and the ring gear 17 are matched in the thick-walled portions 15a, respectively. Accordingly, the matching of the welding start points 27 and the welding end points 28 enables piercing welding to be avoided even when weld depths become deep at the matched points.

Further, the press-fit portion Pf between the flange 15 and the ring gear 17 is equally divided into the plurality of divided regions 24, 25 arranged along a peripheral direction, and the plurality of divided regions 24, 25 are simultaneously subjected to the welding 23. Accordingly, cooling speed differences among welded portions are reduced as small as possible, and unevenness of thermal strain of the ring gear 17 caused by welding can be eliminated or significantly reduced. This can prevent inclination of the ring gear 17. Also, the welding start point 27 and the welding end point 28 adjacent thereto, of each of the divided regions 24, 25 are matched in the thick-walled portion 15a. Accordingly, influence of strength reduction in the flange 15 and the ring gear 17 caused by a plurality of twice-welded portions can be suppressed, and piercing welding can be avoided at each matched point.

Moreover, the pin hole 13 into which the falling-off prevention pin 14 for the pinion shaft 9 of the differential mechanism 3 is fitted is provided to pass through an outer peripheral portion of the differential case 2 which corresponds to the thick-walled portion 15a, and the welding start points 27 are set with reference to the pin hole 13. Accordingly, the welding end points 28 as well as the welding start points 27 are naturally set in the thick-walled portions 15a, respectively. Thus, welding can be properly performed without providing a special mark for setting the welding start points 27.

Moreover, the recessed portions 19 are left between the flange 15 and the stopper wall 22. The recessed portions 19 contribute to facilitating discharge of gas produced during the welding of the press-fit portion Pf to the outside.

It should be noted that the intervals θ from the welding start point 27 and the welding end point 28 matched with each other to the thin-walled portions 15b are desirably set to 45° or more about the central axis of the flange 15. Specifically, in a case where laser output for the thin-walled portions 15b is reduced lower than that for the thick-walled portions 15a, the laser output can be reduced in a state in which the output is even more stable than immediately after the start of the laser output by providing a sufficient interval θ from the welding start point 27 to the thin-walled portion 15b. As a result, the laser output can be easily controlled. Moreover, the thermal strain of the thin-walled portions 15b occurring due to an increase in welding heat input caused by the matching of the welding start point 27 and the welding end point 28 can be suppressed. Further, by setting the matched points of the welding start points 27 and the welding end points 28 at positions located away from the thin-walled portions 15b in the peripheral direction, the strength reduction in the flange 15 and the ring gear 17 can be suppressed.

During torque transmission between the output gear 16 and the ring gear 17, thrust loads in left and right directions act on the ring gear 17, which is a helical gear. The thrust load in the right direction is supported by the flange 15 through a portion subjected to the welding 23, and the thrust load in the left direction is supported by the flange 15 through the stopper wall 22. Accordingly, the load on the portion subjected to the welding 23 can be reduced.

The present invention is not limited to the above-described embodiment, but various design changes can be made without departing from the gist thereof. For example, the weld depth in the thick-walled portions 15a need not be uniform. In the thick-walled portions 15a, the weld depth may be set to be deep (H1) only at the matched points of the welding start points 27 and the welding end points 28. Moreover, the following may be employed: the wall thickness of the flange 15 is measured; the welding start points 27 and the welding end points 28 are set at thickest points in the thick-walled portions 15a; and the weld depth is set to be deep (H1) only at the matched points. Further, while an explanation has been made in the above-described embodiment on the assumption that the thin-walled portions 15b are welded, the thin-walled portions 15b need not be welded in the case where the welding of the thick-walled portions 15a achieve sufficient weld strength.

What is claimed is:

1. A differential device comprising a differential mechanism and a differential case housing the differential mechanism therein, the differential case comprising:
    a case body;
    first and second bearing bosses formed integrally with the case body on a first side portion and a second side portion of the differential case, respectively, the first and second bearing bosses being aligned on a rotary axis and configured to be supported by a transmission case via bearings;
    an annular flange, formed integrally with the case body on an intermediate portion thereof, is offset from a center of the differential case and the annular flange is provided on the second side portion of the differential case;
    work windows for inserting the differential mechanism, the work windows being provided in portions of a peripheral wall of the differential case which face each other on a diametrical line orthogonal to the rotary axis, the work windows cutting into the flange to form recessed portions in one of opposite side surfaces of the flange facing toward the first bearing boss, the flange having a ring gear press-fitted to an outer peripheral surface thereof; and a press-fit junction between the flange and the ring gear, being welded, wherein:
    a stop member, for regulating a press fit depth of the flange and the ring gear, is provided adjacent the press-fit junction between the flange and the ring gear,
    the flange includes thin-walled portions in which the recessed portions exist and thick-walled portions which are free of the recessed portions,
    the thick-walled portions and the ring gear are welded from the other of the opposite side surfaces of the flange facing toward the second bearing boss to a predetermined weld depth, thereby forming a weld seam therebetween, and
    the thin-walled portions and the ring gear are either welded from the other of the opposite side surfaces of the flange facing toward the second bearing boss to a weld depth shallower than the predetermined weld depth, or are not welded.

2. The differential device according to claim 1, wherein a pin hole into which a retaining pin for a pinion shaft of the differential mechanism is fitted is provided to pass through an outer peripheral portion of the differential case, and a welding start point is set with reference to the pin hole.

3. The differential device according to claim 1, wherein the ring gear comprises a rim having a tooth portion on an outer periphery thereof, a hub surrounded by the rim and press-fitted to the flange, and a spoke integrally connecting the rim and the hub; and a rotational center plane of the spoke is disposed closer to the first bearing boss than a rotational center plane of the flange.

4. A method of manufacturing the differential device according to claim 1, wherein when the welding is performed on the thin-walled portions and the ring gear, welding output is reduced lower than that in the welding of the thick-walled portions, or welding speed is increased higher than that in the welding of the thick-walled portions.

5. The differential device according to claim 1, wherein a welding start point and a welding end point of the press-fit junction between the flange and the ring gear are matched in each of the thick-walled portions.

6. The differential device according to claim 5, wherein the press-fit junction between the flange and the ring gear is equally divided into a plurality of divided regions arranged along a peripheral direction, and the welding start point and the welding end point adjacent thereto, of each of the divided regions are matched in each of the thick-walled portions.

7. The differential device according to claim 5, wherein intervals from the welding start point and the welding end point matched with each other to the thin-walled portions are set to 45° or more about a central axis of the flange.

* * * * *